United States Patent
Xie et al.

(10) Patent No.: US 11,858,439 B2
(45) Date of Patent: Jan. 2, 2024

(54) CIRCUIT AND METHOD FOR PROVIDING MULTI-MODE ELECTRICAL POWER TO AN ELECTRICAL LOAD IN A VEHICLE

(71) Applicant: LEAR CORPORATION, Southfield, MI (US)

(72) Inventors: Wang Xie, Shanghai (CN); Xuebei Ren, Shanghai (CN); Diwei Fang, Shanghai (CN)

(73) Assignee: LEAR CORPORATION, Southfield, MI (US)

(*) Notice: Subject to any disclaimer, the term of this patent is extended or adjusted under 35 U.S.C. 154(b) by 0 days.

(21) Appl. No.: 17/967,978

(22) Filed: Oct. 18, 2022

(65) Prior Publication Data

US 2023/0138760 A1 May 4, 2023

(30) Foreign Application Priority Data

Nov. 4, 2021 (CN) .......................... 202111301788.6

(51) Int. Cl.
*B60R 16/033* (2006.01)
*B60L 58/18* (2019.01)

(52) U.S. Cl.
CPC ............ *B60R 16/033* (2013.01); *B60L 58/18* (2019.02)

(58) Field of Classification Search
CPC ................................ B60R 16/033; B60L 58/18
See application file for complete search history.

(56) References Cited

U.S. PATENT DOCUMENTS

| | | | |
|---|---|---|---|
| 9,052,364 B2 | 6/2015 | Cho | |
| 9,734,971 B2 | 8/2017 | Kim | |
| 9,810,742 B2* | 11/2017 | Giordano | G01R 31/327 |
| 10,857,956 B2 | 12/2020 | Kim et al. | |
| 2004/0189248 A1* | 9/2004 | Boskovitch | H02J 7/0014 |
| | | | 320/116 |
| 2013/0093427 A1* | 4/2013 | Bemrich | B60L 50/61 |
| | | | 324/418 |
| 2013/0335100 A1* | 12/2013 | Boehm | G01R 35/00 |
| | | | 324/537 |
| 2015/0137819 A1* | 5/2015 | Giordano | H01H 1/0015 |
| | | | 324/418 |
| 2019/0173292 A1* | 6/2019 | Kim | B60L 53/30 |
| 2020/0346599 A1 | 11/2020 | Lee et al. | |
| 2022/0294206 A1* | 9/2022 | Li | H02H 3/087 |

* cited by examiner

*Primary Examiner* — Jared Fureman
*Assistant Examiner* — Esayas G Yeshaw
(74) *Attorney, Agent, or Firm* — BROOKS KUSHMAN P.C.

(57) ABSTRACT

A circuit and method for providing multi-mode power to a vehicle load may include first and second voltage sources, main positive and main negative relays, and first, second, and third relays. The main positive relay may have a second side connected to a first side of the load, and the main negative relay may have a second side connected to a second side of the load. A first side of the second relay may be connected to a positive side of the first voltage source, and a second side of the second relay to a positive side of the second voltage source and a first side of the main positive relay. A first side of the third relay may be connected to a negative side of the second voltage source, and a second side of the third relay to a first side of the main negative relay.

20 Claims, 6 Drawing Sheets

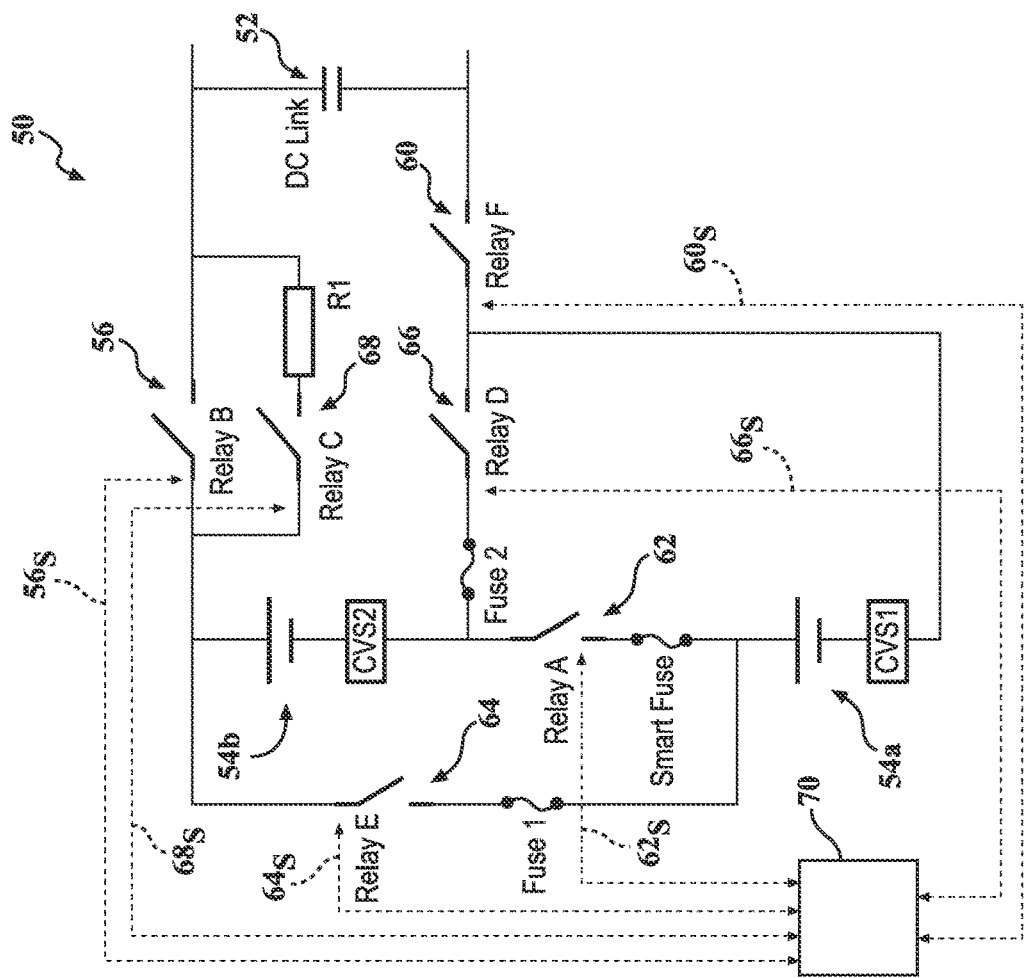
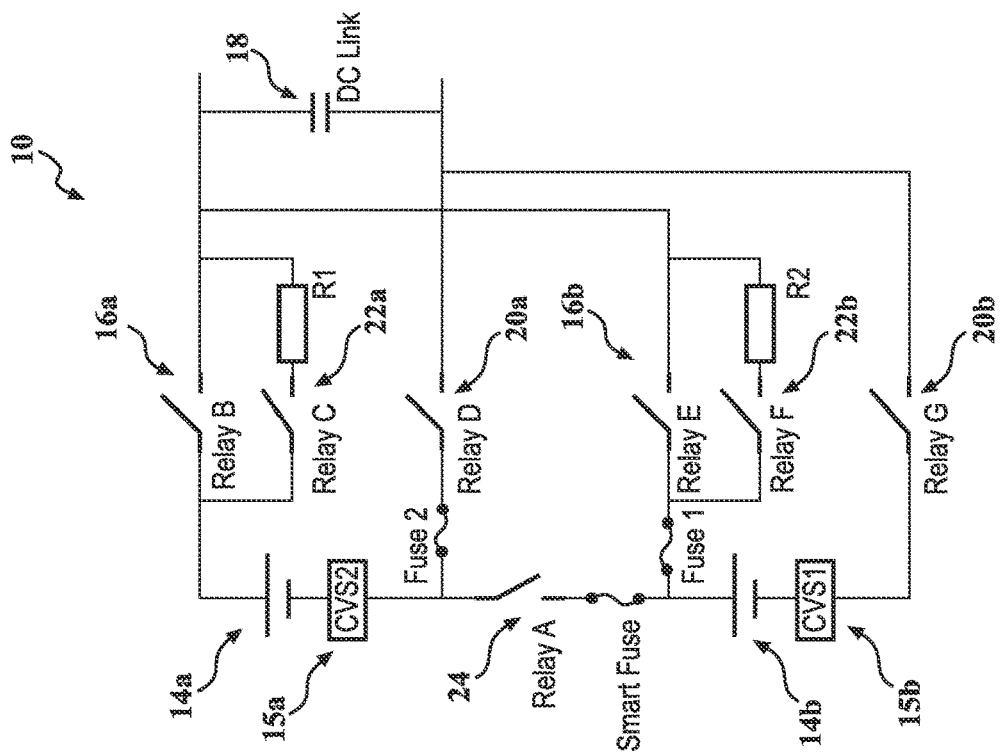
FIG. 1B
FIG. 1A

CIRCUIT AND METHOD FOR PROVIDING MULTI-MODE ELECTRICAL POWER TO AN ELECTRICAL LOAD IN A VEHICLE

CROSS-REFERENCE TO RELATED APPLICATION

This application claims foreign priority benefits under 35 U.S.C. § 119(a)-(d) to CN patent application 202111301788.6 filed Nov. 4, 2021, the disclosure of which is hereby incorporated by reference in its entirety.

TECHNICAL FIELD

The following relates to a circuit and method for providing multi-mode electrical power to an electrical load in a vehicle.

BACKGROUND

A topology of a high-voltage (HV) architecture for an electric vehicle may include duplicate circuits each including a HV (e.g., 400 volts) voltage source, a main positive relay connecting a positive side of the HV voltage source to an electrical load (e.g., a direct current (DC) link capacitor), a main negative relay connecting a negative side of the HV voltage source to the electrical load, and a pre-charge relay connected in parallel with the main positive relay. Such a topology may also include a relay connecting the positive side of one HV voltage source to the negative side of the other HV voltage source.

In such a topology, by providing different configurations of open or closed states of the various relays, the electrical load may be connected individually to one or the other HV voltage source, to both connected in series, or to both connected in parallel. However, the duplication of circuits in such a topology increases the cost as well as the number of possible failure points (e.g., a "stuck open" (i.e., welded) or "stuck closed" relay) associated therewith. Such a topology also requires a complex relay control sequence for detecting the status of relays and providing individual, series, or parallel connection of the HV voltage source(s) to the vehicle electrical load.

As a result, there exists a need for an improved circuit and method for providing multi-mode electrical power to an electrical load in a vehicle. Such an improved circuit and method would provide a topology of a HV architecture for an electric vehicle that would reduce the number of components needed, thereby reducing both cost and the number of possible failure points associated therewith. Such an improved circuit and method would also provide a simplified and/or improved relay control sequence for detecting the status of relays and providing multiple modes of power to a vehicle electrical load.

SUMMARY

According to one non-limiting exemplary embodiment described herein, a circuit for providing multi-mode electrical power to a load in a vehicle is provided. The circuit comprises a first voltage source having a positive side and a negative side, a second voltage source having a positive side and a negative side, a main positive relay having a first side and a second side, the second side of the main positive relay connected to a first side of the load, and a main negative relay having a first side and a second side, the second side of the main negative relay connected to a second side of the load. The circuit further comprises a first relay operable between an open position and a closed position, the first relay having a first side and a second side, the first side of the first relay connected to the positive side of the first voltage source, and the second side of the first relay connected to the negative side of the second voltage source. The circuit further comprises a second relay operable between an open position and a closed position, the second relay having a first side and a second side, the first side of the second relay connected to the positive side of the first voltage source, and the second side of the second relay connected to the positive side of the second voltage source and the first side of the main positive relay. The circuit further comprises a third relay operable between an open position and a closed position, the third relay having a first side and a second side, the first side of the third relay connected to the negative side of the second voltage source, and the second side of the third relay connected to the first side of the main negative relay.

According to another non-limiting exemplary embodiment described herein, a method for providing multi-mode electrical power to a load in a vehicle is provided, the vehicle having a first voltage source and a second voltage source, the load having a first side and a second side, the first voltage source having a positive side and a negative side, and the second voltage source having a positive side and a negative side. The method comprises connecting a main positive relay having a first side and second side to the vehicle load by connecting the second side of the main positive relay to the first side of the load, and connecting a main negative relay having a first side and second side to the vehicle load by connecting the second side of the main negative relay to the second side of the load. The method further comprises connecting a first relay having a first side and a second side to the first voltage source and the second voltage source by connecting the first side of the first relay to the positive side of the first voltage source and connecting the second side of the first relay to the negative side of the second voltage source. The method further comprises connecting a second relay having a first side and a second side to the first voltage source, the second voltage source, and the main positive relay by connecting the first side of the second relay to the positive side of the first voltage source and connecting the second side of the second relay to the positive side of the second voltage source and the first side of the main positive relay. The method further comprises connecting a third relay having a first side and a second side to the second voltage source and the main negative relay by connecting the first side of the third relay to the negative side of the second voltage source and connecting the second side of the third relay to the first side of the main negative relay, wherein each of the first, second, and third relays is independently operable between an open position and a closed position. The method further comprises providing electrical power from the first voltage source and/or the second voltage source to the vehicle load according to one of a plurality of operating modes by opening or closing each of the first, second, and third relays.

According to another non-limiting exemplary embodiment described herein, a non-transitory computer readable storage medium is provided having stored computer executable instructions for providing multi-mode electrical power to a load in a vehicle, the vehicle comprising (i) a first voltage source having a positive side and a negative side, (ii) a second voltage source having a positive side and a negative side, (iii) a main positive relay having a first side and a second side, the second side of the main positive relay connected to a first side of the load, (iv) a main negative relay having a first side and a second side, the second side of the main negative relay connected to a second side of the load, (v) a first relay operable between an open position and a closed position, the first relay having a first side and a second side, the first side of the first relay connected to the positive side of the first voltage source, and the second side of the first relay connected to the negative side of the second voltage source, (vi) a second relay operable between an open position and a closed position, the second relay having a first side and a second side, the first side of the second relay connected to the positive side of the first voltage source, and the second side of the second relay connected to the positive side of the second voltage source and the first side of the main positive relay, (vii) a third relay operable between an open position and a closed position, the third relay having a first side and a second side, the first side of the third relay connected to the negative side of the second voltage source, and the second side of the third relay connected to the first side of the main negative relay, and (viii) a controller configured to independently control operation of the first, second, and third relays between open and closed positions. The computer executable instructions are configured to cause the controller to provide electrical power from the first voltage source and/or the second voltage source to the vehicle load according to one of a plurality of operating modes based on the open or closed positions of the first, second, and third relays.

A detailed description of these and other non-limiting exemplary embodiments of a circuit and method for providing multi-mode electrical power to an electrical load in a vehicle is set forth below together with the accompanying drawings.

BRIEF DESCRIPTION OF THE DRAWINGS

FIG. 1A is a simplified schematic diagram of a known topology for a high-voltage architecture for providing electrical power to an electrical load in a vehicle;

FIG. 1B is an exemplary, simplified schematic diagram of one exemplary embodiment of a topology for a high-voltage architecture for providing electrical power to an electrical load in a vehicle according to the present disclosure;

DETAILED DESCRIPTION

Figure 2A:
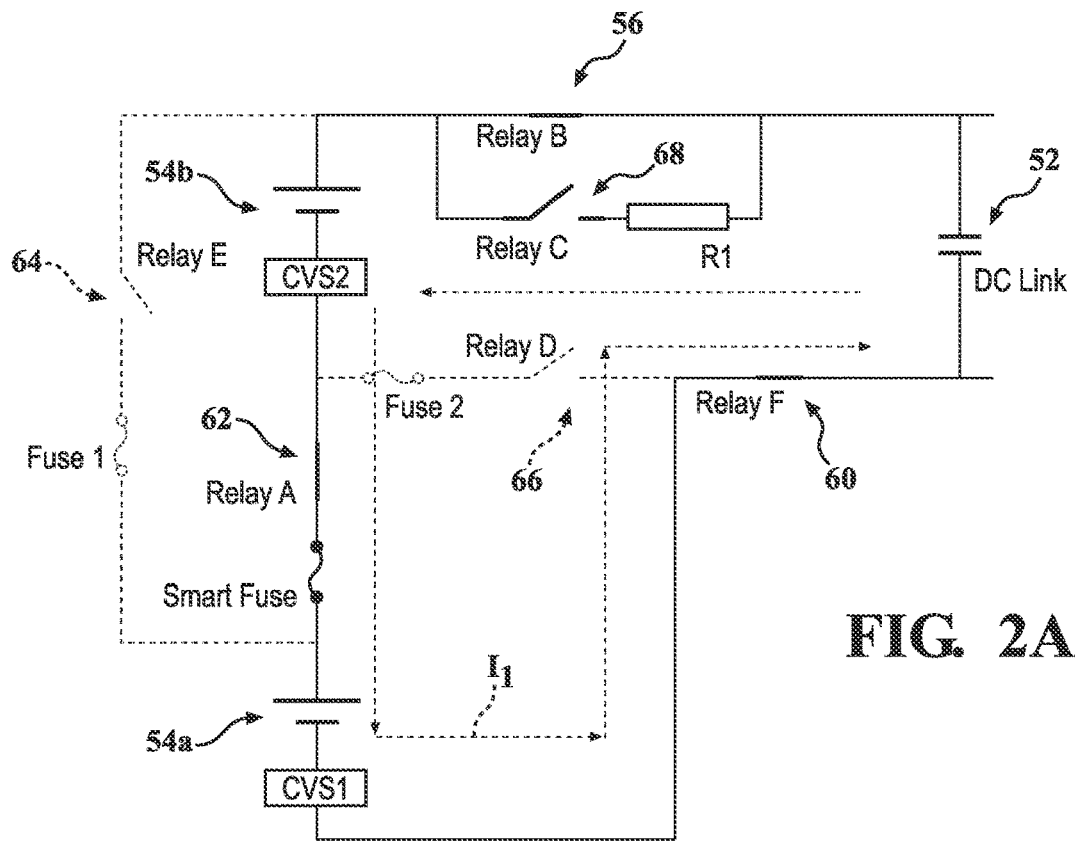
FIGS. 2A-2D are exemplary, simplified schematic diagrams illustrating exemplary control of the relays shown in FIG. 1B of the exemplary embodiment of a topology for a high-voltage architecture for providing electrical power to an electrical load in a vehicle according to the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to Figures, a more detailed description of non-limiting exemplary embodiments of a circuit and method for providing multi-mode electrical power to an electrical load in a vehicle will be provided. For ease of illustration and to facilitate understanding, like reference numerals may be used herein for like components and features throughout the drawings.

FIG. 1A is a simplified schematic diagram of a known topology 10 for a high-voltage (HV) architecture for providing electrical power to an electrical load 18 in a vehicle. As seen therein, the topology 10 may include duplicate circuits each including a HV (e.g., 400 volts) voltage source, 14a and 14b, each of which may have an associated current voltage sensor (CVS), 15a and 15b. Each circuit in the topology 10 may also include a main positive relay 16a (Relay B) and 16b (Relay E), connecting a positive side of its respective HV voltage source, 14a and 14b, to an electrical load 18, e.g., a direct current (DC) link capacitor. Each circuit may also include a main negative relay 20a (Relay D) and 20b (Relay G), connecting a negative side of its respective HV voltage source, 14a and 14b, to the electrical load 18. Each circuit may also include a pre-charge relay 22a (Relay C) and 22b (Relay F), connected in parallel with its respective main positive relay 16a (Relay B) and 16b (Relay E). Such a topology may also include a relay 24 connecting the positive side of voltage source 14b to the negative side of voltage source 14a.

In such a topology 10, by providing different configurations of open or closed states of the various relays 16a, 16b, 20a, 20b, 22a, 22b, 24, the electrical load 18 may be connected individually to voltage source 14a or 14b, or to both voltage source 14a and voltage source 14b connected in series, or to both voltage source 14a and voltage source 14b connected in parallel. In that regard, as is known to those of ordinary skill in the art, each of the relays 16a, 16b, 20a, 20b, 22a, 22b, 24 is operable between or to an open position and a closed position. It is also noted that a controller (not shown) may be provided in communication with the relays 16a, 16b, 20a, 20b, 22a, 22b, 24 and configured to generate one or more control signals for operating or to operate each of the relays 16a, 16b, 20a, 20b, 22a, 22b, 24 between or to its respective open or closed position or state.

More specifically, still referring to FIG. 1A, closing relays 16a (Relay B) and (Relay D) while opening relays 24 (Relay A), 16b (Relay E), 22b (Relay F), and 20b (Relay G) will connect only voltage source 14a to the electrical load 18. Similarly, closing relays 16b (Relay E) and 20b (Relay G) while opening relays 24 (Relay A), 16a (Relay B), 22a (Relay C), and 20a (Relay D) will connect only voltage source 14b to the electrical load 18. Moreover, closing relays 16a (Relay B), 20a (Relay D), 16b (Relay E), and 20b (Relay G) while opening relay 24 (Relay A) will connect voltage source 14a and voltage source 14b in parallel to the electrical load 18. Furthermore, closing relays 24 (Relay A), 16a (Relay B), and 20b (Relay G) while opening relays 20a (Relay D), 16b (Relay E), and 22b (Relay F) will connect voltage source 14a and voltage source 14b in series to the electrical load 18.

However, the duplication of circuits in topology 10 increases the cost as well as the number of possible failure points (e.g., a "stuck open" (i.e., welded) or a "stuck closed" relay (16a, 16b, 20a, 20b, 22a, 22b, 24)) associated therewith. Topology 10 also requires a complex relay control sequence for detecting the status of relays 16a, 16b, 20a, 20b, 22a, 22b, 24 and providing individual, series, or parallel connection of voltage source 14a and voltage source 14b to the vehicle electrical load 18.

As a result, there exists a need for an improved circuit and method for providing multi-mode electrical power to an electrical load in a vehicle. Such an improved circuit and method would provide a topology of a HV architecture for an electric vehicle that would reduce the number of components needed, thereby reducing both cost and the number of possible failure points associated therewith. Such an improved circuit and method would also provide a simplified and/or improved relay control sequence for detecting the status of relays and providing multiple modes of power to a vehicle electrical load.

In that regard, FIG. 1B is an exemplary, simplified schematic diagram of one exemplary embodiment of a topology 50 for a high-voltage architecture for providing electrical power to an electrical load 52 in a vehicle according to the present disclosure. As seen therein, the topology 50 may include a circuit for providing multi-mode electrical power to a load 52 in a vehicle, e.g., a DC link capacitor. The circuit may comprise a first voltage source, 54a, having a positive side and a negative side, and a second voltage source, 54b, having a positive side and a negative side. The circuit may further comprise a main positive relay 56 (Relay B) having a first side and a second side. The second side of the main positive relay 56 (Relay B) may be connected to a first side of the load 52. The circuit may still further comprise a main negative relay 60 (Relay F) having a first side and a second side. The second side of the main negative relay 60 (Relay F) may be connected to a second side of the load 52.

The circuit may also comprise a first relay 62 (Relay A) having a first side and a second side. The first side of the first relay 62 (Relay A) may be connected to the positive side of the first voltage source 54a, and the second side of the first relay 62 (Relay A) may be connected to the negative side of the second voltage source 54b. The circuit may further comprise a second relay 64 (Relay E) having a first side and a second side. The first side of the second relay 64 (Relay E) may be connected to the positive side of the first voltage source 54a, and the second side of the second relay 64 (Relay E) may be connected to the positive side of the second voltage source 54b and the first side of the main positive relay 56 (Relay B). The circuit may still further comprise a third relay 66 (Relay D) having a first side and a second side. The first side of the third relay 66 (Relay D) may be connected to the negative side of the second voltage source 54b, and the second side of the third relay 66 (Relay D) may be connected to the first side of the main negative relay 60 (Relay F). The circuit may also comprise a precharge relay 68 (Relay C) which may be connected in parallel with the main positive relay 56 (Relay B).

Electrical power may be provided from the first voltage source 54a and/or the second voltage source 54b to the vehicle load 52 according to one of a plurality of operating modes based on the open or closed positions of the first relay 62 (Relay A), the second relay 64 (Relay E), and the third relay 66 (Relay D). Once again, as is known to those of ordinary skill in the art, each of the relays 56, 60, 62, 64, 66, 68 is operable between or to an open position and a closed position. In that regard, it is noted that FIG. 1B illustrates all the relays 56, 60, 62, 64, 66, 68 in their respective open positions.

It is also noted that a controller 70 may be provided in communication with the relays 56, 60, 62, 64, 66, 68 via signal lines 56s, 60s, 62s, 64s, 66s, 68s. The controller 70 may also be configured to generate one or more control signals and to transmit such control signals to the relays 56, 60, 62, 64, 66, 68 via signal lines 56s, 60s, 62s, 64s, 66s, 68s for operating or to operate each of the relays 56, 60, 62, 64, 66, 68 between or to its respective open or closed position or state. In that regard, the relays 56, 60, 62, 64, 66, 68 may be independently controlled between or to their respective open and closed positions, and the controller 70 may be configured to independently control operation of the relays 56, 60, 62, 64, 66, 68 between or to their respective open and closed positions.

As those skilled in the art will understand, the controller 70, as well as any other controller, control unit, communication unit, system, subsystem, unit, module, interface, sensor, device, relay, switch, component, or the like described herein may individually, collectively, or in any combination comprise appropriate circuitry, such as one or more appropriately programmed processors (e.g., one or more microprocessors including central processing units (CPU)) and associated memory, storage media, or storage device(s), which may include stored operating system software and/or application software executable by the processor(s) for controlling operation thereof and for performing the particular algorithm or algorithms represented by the various methods, functions and/or operations described herein, including interaction between and/or cooperation with each other. One or more of such processors, as well as other circuitry and/or hardware, may be included in a single Application-Specific Integrated Circuitry (ASIC), or several processors and various circuitry and/or hardware may be distributed among several separate components, whether individually packaged or assembled into a System-on-a-Chip (SoC). The controller 70, as well as any other controller, control unit, communication unit, system, subsystem, unit, module, interface, sensor, device, relay, switch, component, or the like described herein, may therefore comprise one or more processors and associated memory, storage media, or storage device having stored computer executable instructions for performing the particular algorithm or algorithms represented by the various methods, functions and/or operations described herein. In that regard, it is noted that the computer executable instructions described herein may be stored in or on a computer readable storage medium which may comprise any known type of storage medium or device and may be part of or associated with the controller 70.

FIGS. 2A-2D are exemplary, simplified schematic diagrams illustrating exemplary control of the relays 56, 60, 62, 64, 66, 68 shown in FIG. 1B of the exemplary embodiment of a topology 50 for a HV architecture for providing electrical power to an electrical load 52 in a vehicle according to the present disclosure. In that regard, while the controller 70 and signal lines 56s, 60s, 62s, 64s, 66s, 68s shown in FIG. 1B have been omitted from each of FIGS. 2A-2D, it is noted that the relays 56, 60, 62, 64, 66, 68 shown in FIGS. 2A-2D are nevertheless controlled by the controller 70 via signal lines 56s, 60s, 62s, 64s, 66s, 68s, which have been omitted from FIGS. 2A-2D solely to simplify those figures for ease of illustration.

Referring first to FIG. 2A, and with continuing reference to FIG. 1B, in one operating mode, the controller 70 may control the relays 56, 60, 62, 64, 66, 68 such that first relay 62 may be opened, the second relay 64 may be closed, and the third relay 66 may be opened to thereby connect the first and second voltage sources 54a, 54b to the load 52, wherein the first and second voltage source 54a, 54b are connected in series. In that regard, a first current travels along the path labeled $I_1$ when the controller 70 controls the main positive relay 56 (and/or the pre-charge relay 68) as well as the main negative relay 60 to closed positions. In such a fashion, where each voltage source 54a, 54b is a 400-volt high-voltage battery or battery pack, an 800-volt compatible HV architecture is provided wherein a total of 800 volts is provided by voltage sources 54a and 54b to the load 52. It is noted that the pre-charge relay 68 is shown in FIG. 2A in an open position, having been controlled by the controller 70 to such a position after having been previously controlled by the controller 70 (along with the main negative relay to a closed position to pre-charge the DC link capacitor 52. After such a pre-charge of the DC link capacitor 52, the controller 70 may then control the main positive relay 56 to its closed position and then control the pre-charge relay 68 to its open position.

Figure 2B:
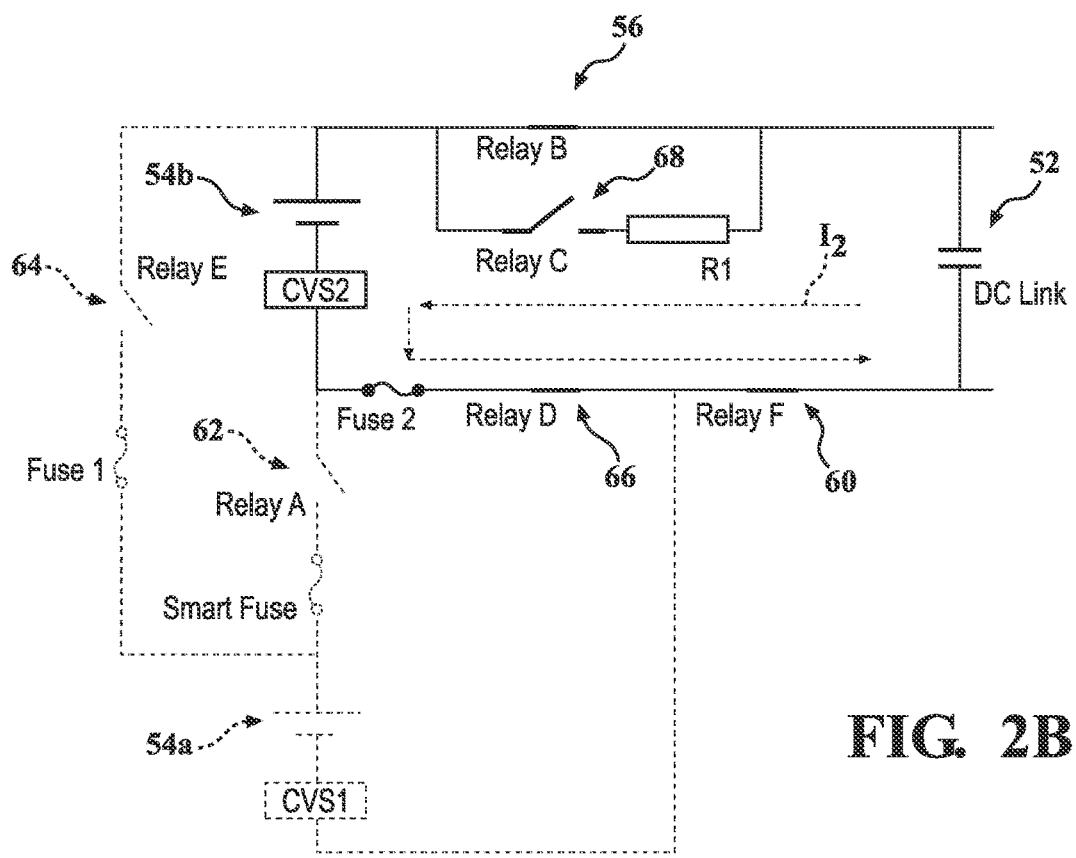

Referring next to FIG. 2B, and with continuing reference to FIG. 1B, in another operating mode, the controller 70 may control the relays 56, 60, 62, 64, 66, 68 such that the first relay 62 may be opened, the second relay 64 may be opened, and the third relay 66 may be closed to thereby connect only the second voltage source 54b to the load 52. In that regard, a second current travels along the path labeled I2 when the controller 70 controls the main positive relay 56 (and/or the pre-charge relay 68) as well as the main negative relay 60 to closed positions. In such a fashion, where each voltage source 54a, 54b is a 400-volt high-voltage battery or battery pack, a total of 400 volts is provided by voltage source 54b to the load 52. It is noted that the pre-charge relay 68 is shown in FIG. 2B in an open position, having been controlled by the controller 70 to such a position after having been previously controlled by the controller 70 (along with the main negative relay 60) to its closed position to pre-charge the DC link capacitor 52. After such a pre-charge of the DC link capacitor 52, the controller 70 may then control the main positive relay 56 to its closed position and then control the pre-charge relay 68 to its open position.

Figure 2C:
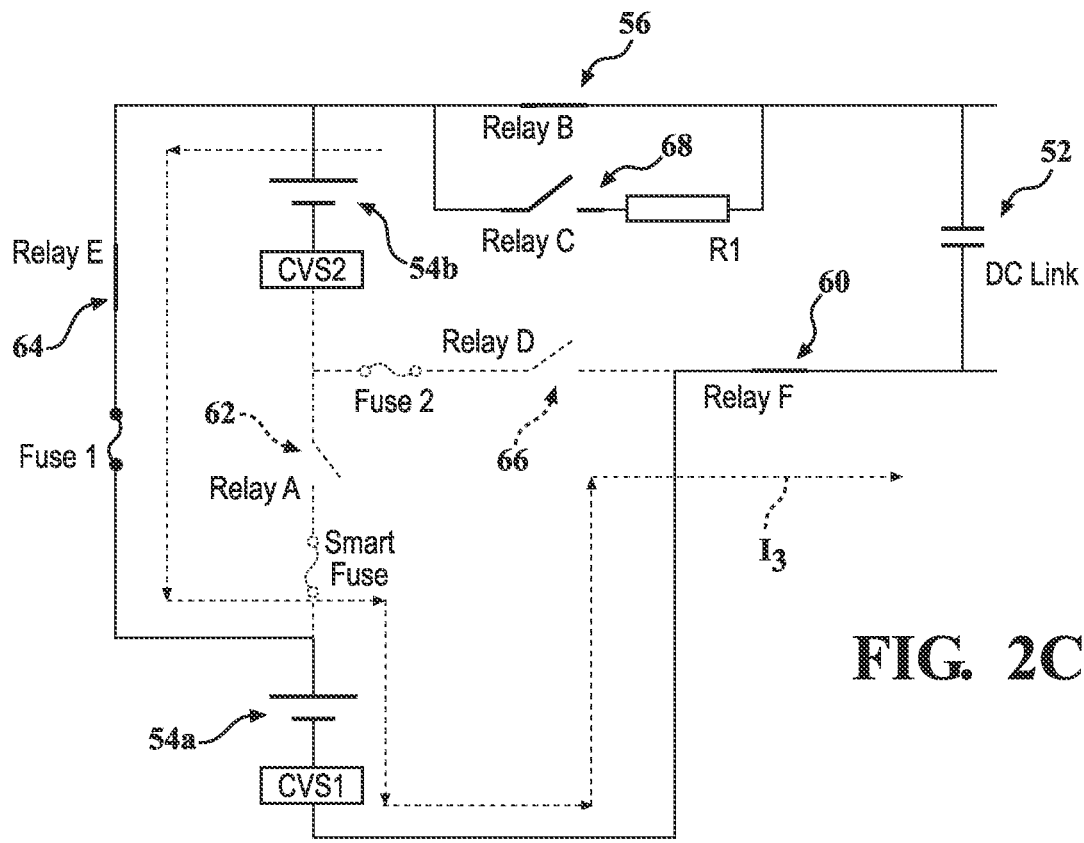

Referring next to FIG. 2C, and with continuing reference to FIG. 1B, in another operating mode, the controller 70 may control the relays 56, 60, 62, 64, 66, 68 such that the first relay 62 may be opened, the second relay 64 may be closed, and the third relay 66 may be opened to thereby connect only the first voltage source 54a to the load 52. In that regard, a third current travels along the path labeled I3 when the controller 70 controls the main positive relay 56 (and/or the pre-charge relay 68) as well as the main negative relay 60 to closed positions. In such a fashion, where each voltage source 54a, 54b is a 400-volt high-voltage battery or battery pack, a 400-volt compatible HV architecture is provided wherein a total of 400 volts is provided by voltage source 54a to the load 52. It is noted that the pre-charge relay 68 is shown in FIG. 2C in an open position, having been controlled by the controller 70 to such a position after having been previously controlled by the controller 70 (along with the main negative relay 60) to its closed position to pre-charge the DC link capacitor 52. After such a pre-charge of the DC link capacitor 52, the controller 70 may then control the main positive relay 56 to its closed position and then control the pre-charge relay 68 to its open position.

Figure 2D:
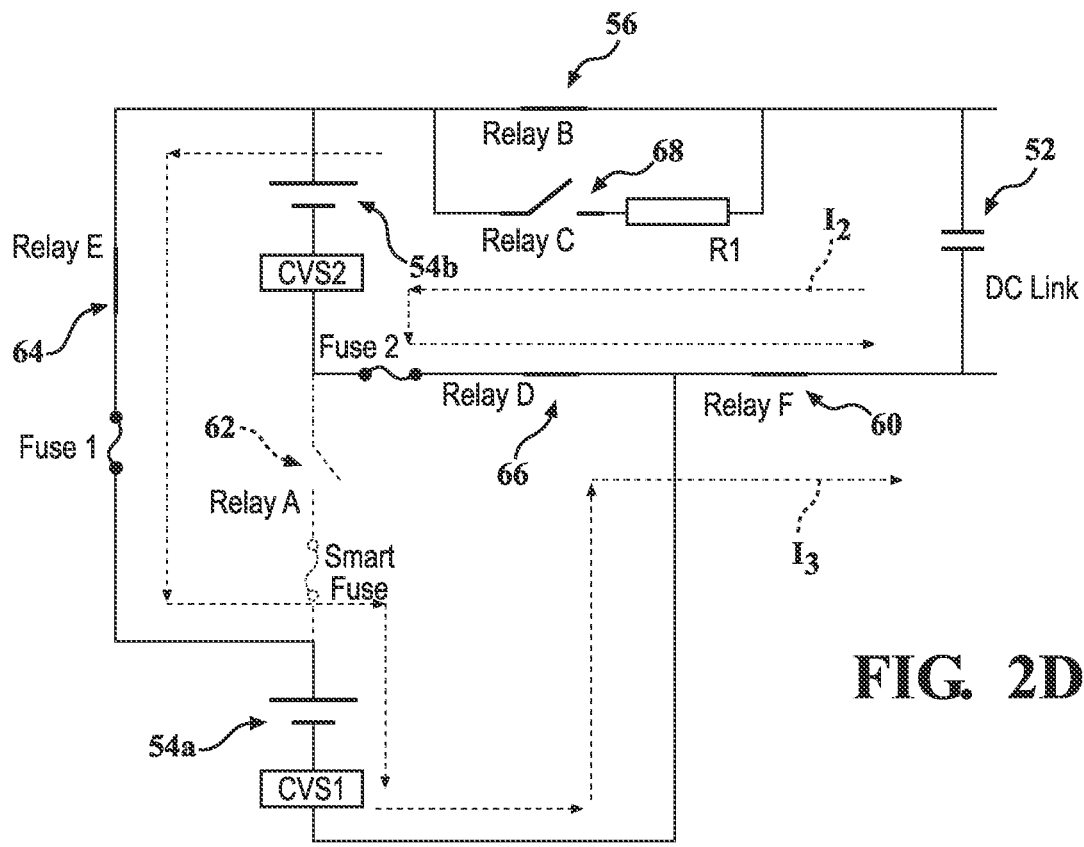

Referring next to FIG. 2D, and with continuing reference to FIG. 1B, in another operating mode, the controller 70 may control the relays 56, 60, 62, 64, 66, 68 such that the first relay 62 may be closed, the second relay 64 may be closed, and the third relay 66 may be closed to thereby connect the first and second voltage sources 54a, 54b to the load 52, wherein the first and second voltage sources 54a, 54b are connected in parallel. In that regard, the second and third currents I2 and I3 travel along the paths shown when the controller 70 controls the main positive relay 56 (and/or the pre-charge relay 68) as well as the main negative relay 60 to closed positions. In such a fashion, where each voltage source 54a, 54b is a 400-volt high-voltage battery or battery pack, a 400-volt compatible HV architecture is provided wherein a total of 400 volts is provided by voltage sources 54a and 54b to the load 52. It is noted that the pre-charge relay 68 is shown in FIG. 2D in an open position, having been controlled by the controller 70 to such a position after having been previously controlled by the controller 70 (along with the main negative relay 60) to its closed position to pre-charge the DC link capacitor 52. After such a pre-charge of the DC link capacitor 52, the controller 70 may then control the main positive relay 56 to its closed position and then control the pre-charge relay 68 to its open position.

Figure 3A:
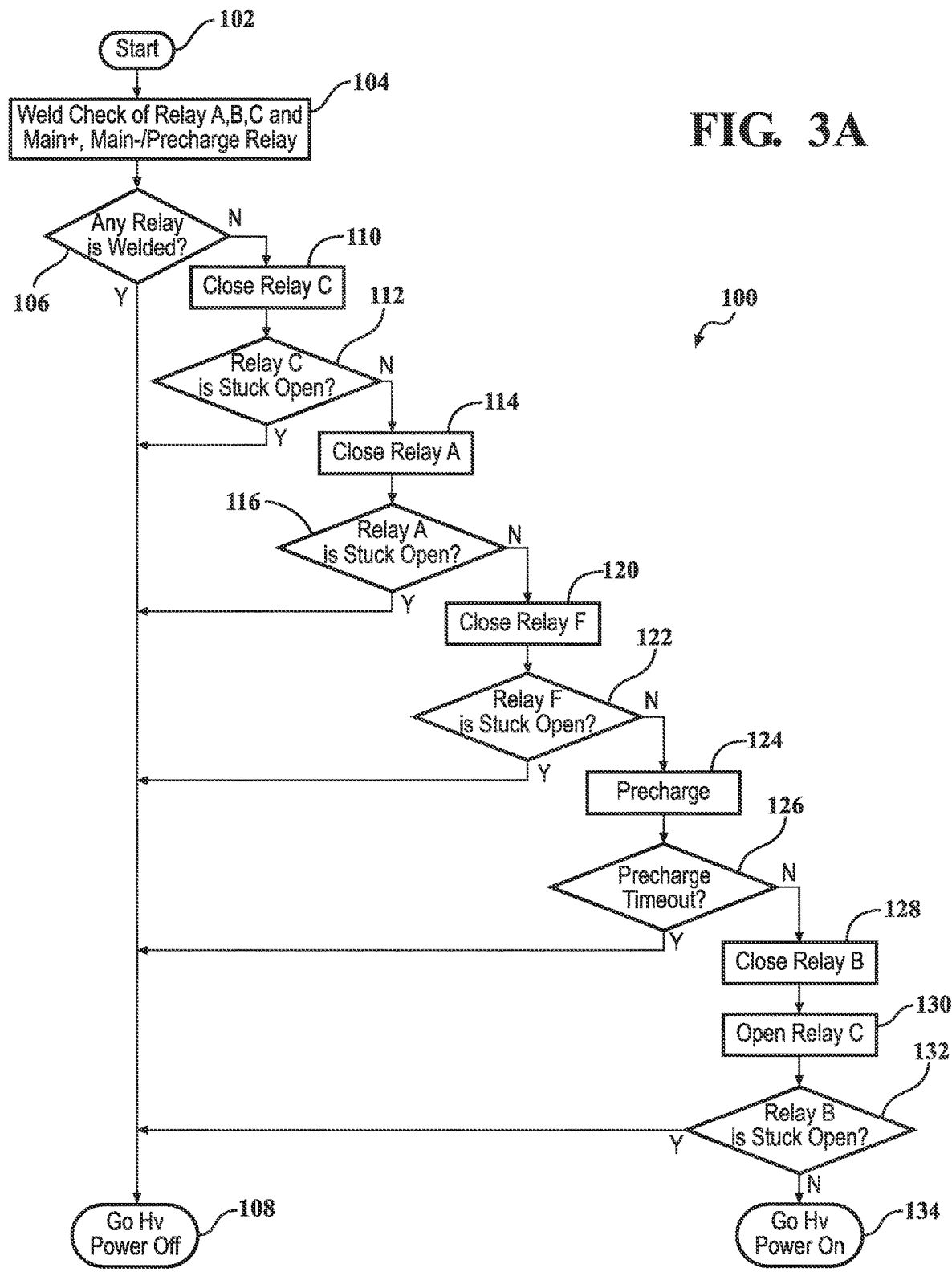
FIG. 3A is an exemplary flowchart illustrating one exemplary embodiment of a control sequence for the relays as shown in FIG. 2A of the exemplary embodiment of a topology for a high-voltage architecture for providing electrical power to an electrical load in a vehicle according to the present disclosure.

FIG. 3A is an exemplary flowchart illustrating one exemplary embodiment of a control sequence 100 for the relays 56, 60, 62, 64, 66, 68 as shown in FIG. 2A of the exemplary embodiment of a topology 50 for a HV architecture for providing electrical power to an electrical load 52 in a vehicle according to the present disclosure. As seen therein, and with continuing reference to FIGS. 1B and 2A, after start 102, the controller 70 may perform a status check 104 of the relays 56, 60, 62, 64, 66, 68 to determine 106 if any one or more of the relays 56, 60, 62, 64, 66, 68 is welded (i.e., "stuck closed"). If so, then the controller 70 may enter and/or may control the circuit and/or method to go to a state of HV power OFF 108, such that no electrical power is provided to the load 52. If not, then the controller 70 may generate a control signal for controlling the pre-charge relay 68 (Relay C) to a closed position 110 and then check 112 whether the status of the pre-charge relay 68 (Relay C) is "stuck open". If so, then the controller 70 may enter and/or may control the circuit and/or method to go to the HV power OFF state 108.

Otherwise, if the status of the pre-charge relay is not "stuck open", then the controller 70 may generate a control signal for controlling the first relay 62 (Relay A) to a closed position 114 and then check 116 whether the status of the first relay 62 (Relay A) is "stuck open". If so, then the controller 70 may enter and/or may control the circuit and/or method to go to the HV power OFF 108 state. If not, then the controller 70 may generate a control signal for controlling the main negative relay 60 (Relay F) to a closed position 120 and then check 122 whether the status of the main negative relay 60 (Relay F) is "stuck open". If so, then the controller 70 may enter and/or may control the circuit and/or method to go to the HV power OFF 108 state. If not, a pre-charge operation 124 may begin and the controller 70 may then determine 126 whether a pre-charge timeout has occurred, i.e., whether a selected period of time has expired before a successful pre-charge of the DC link capacitor 52 has been performed. If so, then the controller 70 may enter and/or may control the circuit and/or method to go to the HV power OFF state 108.

Alternatively, if the controller determines 126 that a pre-charge timeout has not occurred, then the controller may generate a control signal for controlling the main positive relay 56 (Relay B) to a closed position 128 and generate a control signal for controlling the pre-charge relay 68 (Relay C) to an open position 130. The controller 70 may then check 132 whether the status of the main positive relay 56 (Relay B) is "stuck open". If so, then the controller 70 may enter and/or may control the circuit and/or method to go to the HV power OFF 108 state. Otherwise, the controller 70 may enter and/or may control the circuit and/or method to go to a HV power ON state 134 such that both the first and the second voltage sources 54a, 54b are connected to and provide electrical power to the load 52, wherein the first and second voltage source 54a, 54b are connected in series.

Figure 3B:
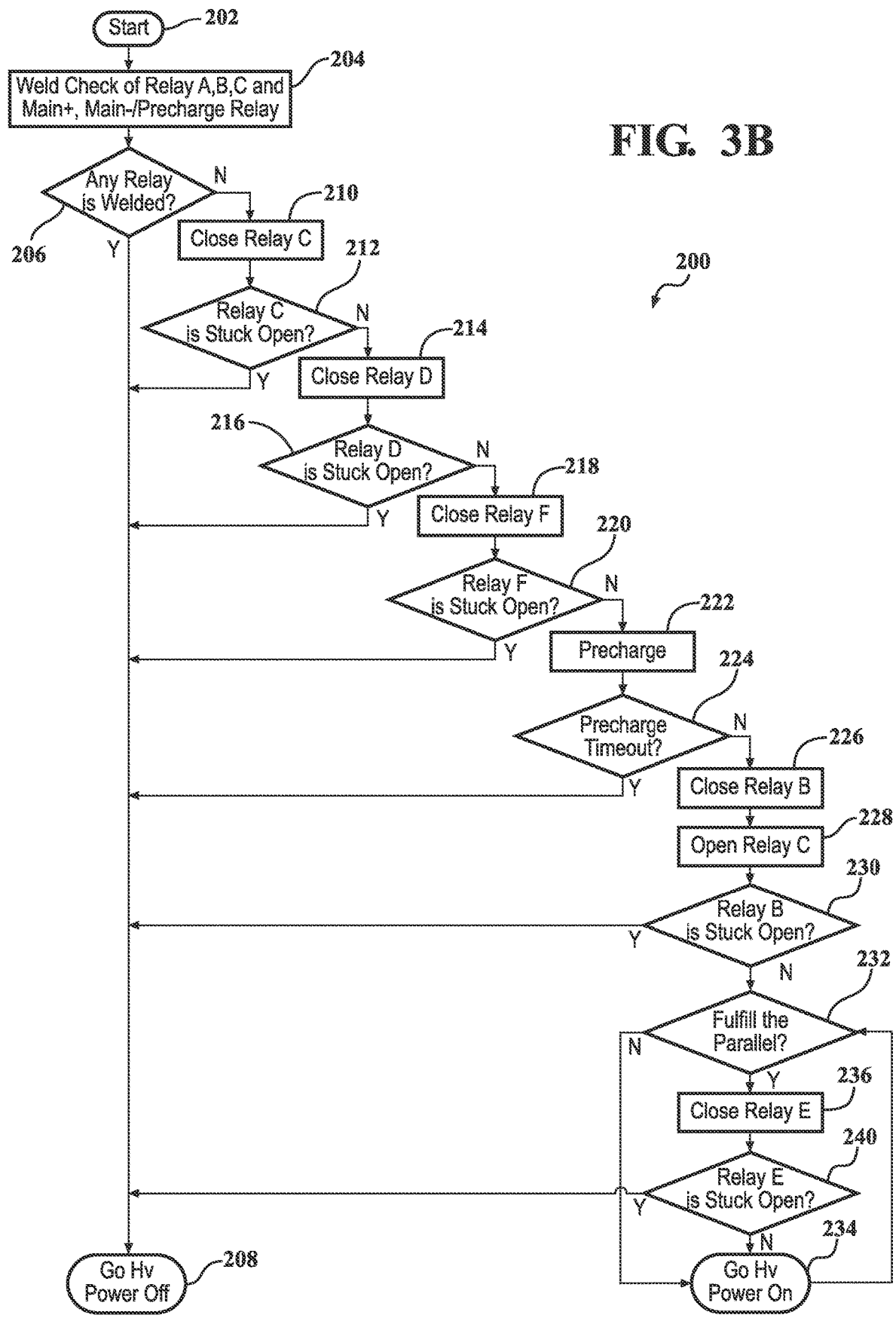
FIG. 3B is an exemplary flowchart illustrating one exemplary embodiment of a control sequence for the relays as shown in FIGS. 2B and 2D of the exemplary embodiment of a topology for a high-voltage architecture for providing electrical power to an electrical load in a vehicle according to the present disclosure.

FIG. 3B is an exemplary flowchart illustrating one exemplary embodiment of a control sequence 200 for the relays 56, 60, 62, 64, 66, 68 as shown in FIGS. 2B and 2D of the exemplary embodiment of a topology 50 for a HV architecture for providing electrical power to an electrical load 52 in a vehicle according to the present disclosure. As seen therein, and with continuing reference to FIGS. 1B, 2B, and 2D, after start 202, the controller 70 may perform a status check 204 of the relays 56, 60, 62, 64, 66, 68 to determine 206 if any one or more of the relays 56, 60, 62, 64, 66, 68 is welded (i.e., "stuck closed"). If so, then the controller 70 may enter and/or may control the circuit and/or method to go to a state of HV power OFF 208, such that no electrical power is provided to the load 52. If not, then the controller 70 may generate a control signal for controlling the pre-charge relay 68 (Relay C) to a closed position 210 and then check 212 whether the status of the pre-charge relay 68 (Relay C) is "stuck open". If so, then the controller 70 may enter and/or may control the circuit and/or method to go to the HV power OFF state 208.

Otherwise, if the status of the pre-charge relay is not "stuck open", then the controller 70 may generate a control signal for controlling the third relay 66 (Relay D) to a closed position 214 and then check 216 whether the status of the third relay 66 (Relay D) is "stuck open". If so, then the controller 70 may enter and/or may control the circuit and/or method to go to the HV power OFF state 208. If not, then the controller 70 may generate a control signal for controlling the main negative relay 60 (Relay F) to a closed position 218 and then check 220 whether the status of the main negative relay 60 (Relay F) is "stuck open". If so, then the controller 70 may enter and/or may control the circuit and/or method to go to the HV power OFF state 208. If not, a pre-charge operation 222 may begin and the controller 70 may then determine 224 whether a pre-charge timeout has occurred, i.e., whether a selected period of time has expired before a successful pre-charge of the DC link capacitor 52 has been performed. If so, then the controller 70 may enter and/or may control the circuit and/or method to go to the HV power OFF state 208.

Alternatively, if the controller 70 determines 224 that a pre-charge timeout has not occurred, then the controller 70 may generate a control signal for controlling the main positive relay 56 (Relay B) to a closed position 226 and generate a control signal for controlling the pre-charge relay 68 (Relay C) to an open position 228. The controller 70 may then check 230 whether the status of the main positive relay 56 (Relay B) is "stuck open". If so, then the controller 70 may enter and/or may control the circuit and/or method to go to the HV power OFF 208 state. If not, the controller 70 may then determine 232 if a parallel connection of the first and second voltage sources 54a, 54b to the load 52 should be fulfilled. If not, then the controller may enter and/or may control the circuit and/or method to go to a HV power ON state 234 such that only the second voltage source 54b is connected to and provides electrical power to the load 52 (see FIG. 2B).

Otherwise, if the controller 70 determines 232 that a parallel connection of the first and second voltage sources 54a, 54b to the load 52 should be fulfilled, then the controller 70 may generate a control signal for controlling the second relay 64 (Relay E) to a closed position 236. The controller 70 may then check 240 whether the status of the second relay 64 (Relay E) is "stuck open". If so, then the controller 70 may enter and/or may control the circuit and/or method to go to the HV power OFF state 208. If not, then the controller 70 may enter and/or may control the circuit and/or method to go to the HV power ON state 234, such that both the first and second voltage sources 54a, 54b are connected to and provide electrical power to the load 52, wherein the first and second voltage sources 54a, 54b are connected in parallel (see FIG. 2D).

Figure 3C:
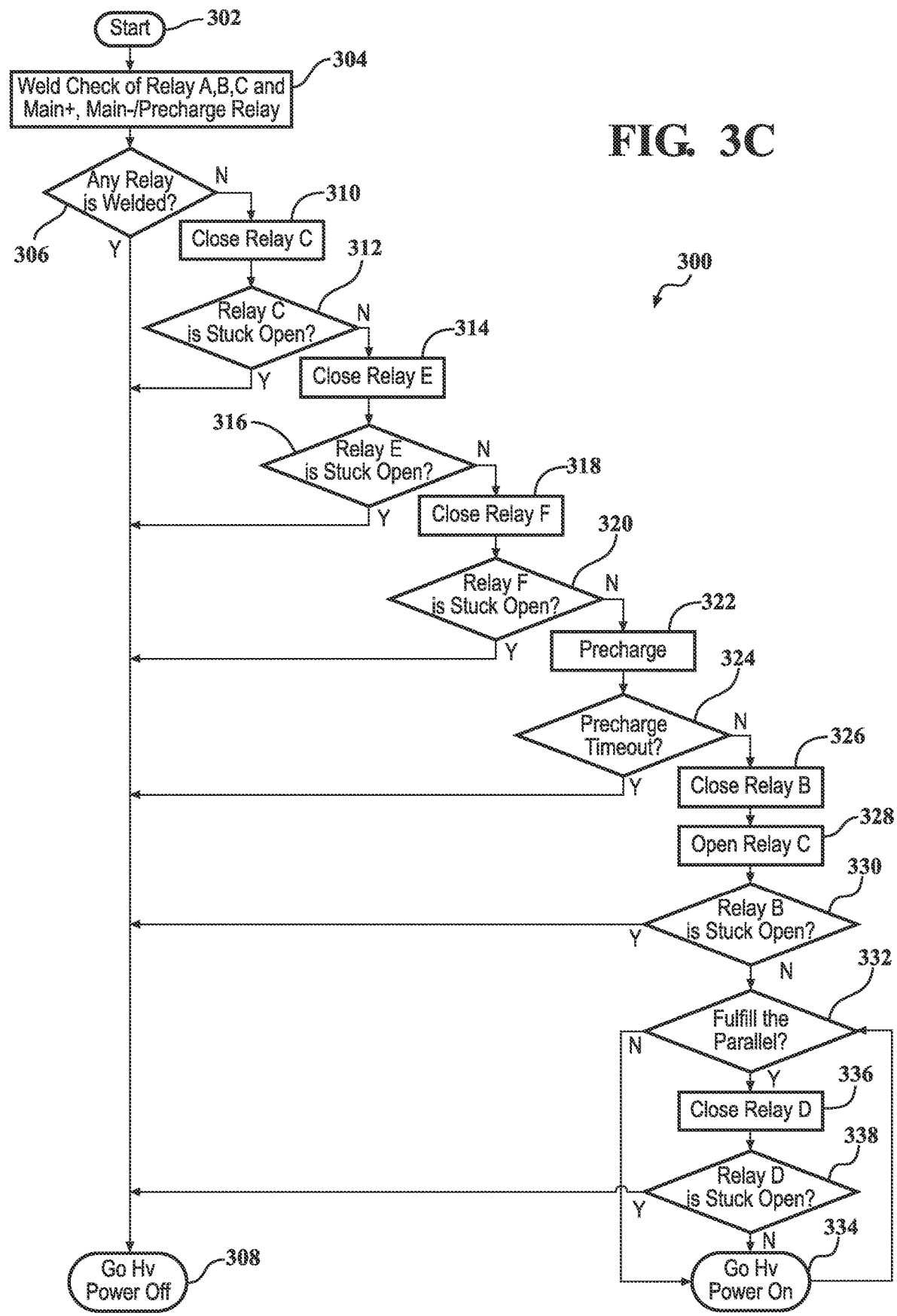
FIG. 3C is an exemplary flowchart illustrating one exemplary embodiment of a control sequence for the relays as shown in FIGS. 2C and 2D of the exemplary embodiment of a topology for a high-voltage architecture for providing electrical power to an electrical load in a vehicle according to the present disclosure.

FIG. 3C is an exemplary flowchart illustrating one exemplary embodiment of a control sequence 300 for the relays 56, 60, 62, 64, 66, 68 as shown in FIGS. 2C and 2D of the exemplary embodiment of a topology 50 for a HV architecture for providing electrical power to an electrical load 52 in a vehicle according to the present disclosure. As seen therein, and with continuing reference to FIGS. 1B, 2C, and 2D, after start 302, the controller 70 may perform a status check 304 of the relays 56, 60, 62, 64, 66, 68 to determine 306 if any one or more of the relays 56, 60, 62, 64, 66, 68 is welded (i.e., "stuck closed"). If so, then the controller 70 may enter and/or may control the circuit and/or method to go to a state of HV power OFF 308, such that no electrical power is provided to the load 52. If not, then the controller 70 may generate a control signal for controlling the pre-charge relay 68 (Relay C) to a closed position 310 and then check 312 whether the status of the pre-charge relay 68 (Relay C) is "stuck open". If so, then the controller 70 may enter and/or may control the circuit and/or method to go to the HV power OFF state 308.

Otherwise, if the status of the pre-charge relay 68 (Relay C) is not "stuck open", then the controller 70 may generate a control signal for controlling the second relay 64 (Relay E) to a closed position 314 and then check 316 whether the status of the third relay 64 (Relay E) is "stuck open". If so, then the controller 70 may enter and/or may control the circuit and/or method to go to the HV power OFF state 308. If not, then the controller 70 may generate a control signal for controlling the main negative relay 60 (Relay F) to a closed position 318 and then check 320 whether the status of the main negative relay 60 (Relay F) is "stuck open". If so, then the controller 70 may enter and/or may control the circuit and/or method to go to the HV power OFF state 308. If not, a pre-charge operation 322 may begin and the controller 70 may then determine 324 whether a pre-charge timeout has occurred, i.e., whether a selected period of time has expired before a successful pre-charge of the DC link capacitor 52 has been performed. If so, then the controller 70 may enter and/or may control the circuit and/or method to go to the HV power OFF state 308.

Alternatively, if the controller 70 determines 324 that a pre-charge timeout has not occurred, then the controller 70 may generate a control signal for controlling the main positive relay 56 (Relay B) to a closed position 326 and generate a control signal for controlling the pre-charge relay 68 (Relay C) to an open position 328. The controller 70 may then check 330 whether the status of the main positive relay 56 (Relay B) is "stuck open". If so, then the controller 70 may enter and/or may control the circuit and/or method to go to the HV power OFF 308 state. If not, the controller 70 may then determine 332 if a parallel connection of the first and second voltage sources 54a, 54b to the load 52 should be fulfilled. If not, then the controller may enter and/or may control the circuit and/or method to go to a HV power ON state 334, such that only the first voltage source 54a is connected to and provides electrical power to the load 52 (see FIG. 2C).

Otherwise, if the controller 70 determines 332 that a parallel connection of the first and second voltage sources 54a, 54b to the load 52 should be fulfilled, then the controller 70 may generate a control signal for controlling the third relay 66 (Relay D) to a closed position 336. The controller 70 may then check 338 whether the status of the third relay 66 (Relay D) is "stuck open". If so, then the controller 70 may enter and/or may control the circuit and/or method to go to the HV power OFF state 308. If not, then the controller 70 may enter and/or may control the circuit and/or method to go to the HV power ON state 334, such that both the first and second voltage sources 54a, 54b are connected to and provide electrical power to the load 52, wherein the first and second voltage sources 54a, 54b are connected in parallel (see FIG. 2D).

Referring now to FIGS. 1A-1B, 2A-2D, and 3A-3C, the present disclosure describes a circuit for providing multi-mode electrical power to a load 52 in a vehicle. The circuit may comprise a first voltage source 54a having a positive side and a negative side, and a second voltage source 54b having a positive side and a negative side. The circuit may further comprise a main positive relay 56 having a first side and a second side, wherein the second side of the main positive relay 56 may be connected to a first side of the load 52. The circuit may also comprise a main negative relay 60 having a first side and a second side, wherein the second side of the main negative relay 60 may be connected to a second side of the load 52.

The circuit may further comprise a first relay 62 operable between an open position and a closed position, the first relay 62 having a first side and a second side, the first side of the first relay 62 connected to the positive side of the first voltage source 54a, and the second side of the first relay 62 connected to the negative side of the second voltage source 54b. The circuit may also comprise a second relay 64 operable between an open position and a closed position, the second relay 64 having a first side and a second side, the first side of the second relay 64 connected to the positive side of the first voltage source 54a, and the second side of the second relay 64 connected to the positive side of the second voltage source 54b and the first side of the main positive relay 56. The circuit may further comprise a third relay 66 operable between an open position and a closed position, the third relay 66 having a first side and a second side, the first side of the third relay 66 connected to the negative side of the second voltage source 54b, and the second side of the third relay 66 connected to the first side of the main negative relay 60. Accordingly, electrical power may be provided from the first voltage source 54a and/or the second voltage source 54b to the vehicle load 52 according to one of a plurality of operating modes based on the open or closed positions of the first relay 62, the second relay 64, and the third relay 66.

In that regard, in a first operating mode, the first relay 62 may be closed, the second relay 64 may be open, and the third relay 66 may be open to thereby connect the first and second voltage sources 54a, 54b to the load 52, wherein the first and second voltage source 54a, 54b are connected in series. In a second operating mode, the first relay 62 may be open, the second relay 64 may be closed, and the third relay 66 may be open to thereby connect only the first voltage source 54a to the load 52. In a third operating mode, the first relay 62 may be open, the second relay 64 may be open, and the third relay 66 may be closed to thereby connect only the second voltage source 54b to the load 52. In a fourth operating mode, the first relay 62 may be open, the second relay 64 may be closed, and the third relay 66 may be closed to thereby connect the first and second voltage sources 54a, 54b to the load 52, wherein the first and second voltage sources 54a, 54b are connected in parallel.

The circuit may further comprise a controller 70 configured to independently control operation of the first relay 62, the second relay 64, and the third relay 66 between open and closed positions. Furthermore, the vehicle may be an electric vehicle and the vehicle load 52 may comprise a direct current (DC) link capacitor. Moreover, the circuit may further comprise a pre-charge relay 68 operable between an open position and a closed position, wherein the pre-charge relay 68 may be connected in parallel with the main positive relay 56.

Referring still to FIGS. 1A-1B, 2A-2D, and 3A-3C, the present disclosure describes a method for providing multi-mode electrical power to a load 52 in a vehicle having a first voltage source 54a and a second voltage source 54b, the load 52 having a first side and a second side, the first voltage source 54a having a positive side and a negative side, and the second voltage source 54b having a positive side and a negative side. The method may comprise connecting a main positive relay 56 having a first side and second side to the vehicle load 52 by connecting the second side of the main positive relay 56 to the first side of the load 52. The method may also comprise connecting a main negative relay 60 having a first side and second side to the vehicle load 52 by connecting the second side of the main negative relay 60 to the second side of the load 52.

The method may further comprise connecting a first relay 62 having a first side and a second side to the first voltage source 54a and the second voltage source 54b by connecting the first side of the first relay 62 to the positive side of the first voltage source 54a and connecting the second side of the first relay 62 to the negative side of the second voltage source 54b. The method may also comprise connecting a second relay 64 having a first side and a second side to the first voltage source 54a, the second voltage source 54b, and the main positive relay 56 by connecting the first side of the second relay 64 to the positive side of the first voltage source 54a and connecting the second side of the second relay 64 to the positive side of the second voltage source 54b and the first side of the main positive relay 56. The method may further comprise connecting a third relay 66 having a first side and a second side to the second voltage source 54b and the main negative relay 60 by connecting the first side of the third relay 66 to the negative side of the second voltage source 54b and connecting the second side of the third relay 66 to the first side of the main negative relay 60.

The method may also comprise providing electrical power from the first voltage source 54a and/or the second voltage 54b source to the vehicle load 52 according to one of a plurality of operating modes by opening or closing each of the first relay 62, the second relay 64, and the third relay 66. In that regard, as previously described, each of the first relay 62, second relay 64, and third relay 66 may be independently operable between an open position and a closed position.

The plurality of operating modes may include a first operating mode and providing electrical power according to the first operating mode may comprise closing the first relay 62, opening the second relay 64, and opening the third relay 66 to thereby connect the first and second voltage sources 54a, 54b to the vehicle load 52, wherein the first and second voltage source 54a, 54b are connected in series. The plurality of operating modes may also include a second operating mode and providing electrical power according to the second operating mode may comprise opening the first relay 62, closing the second relay 64, and opening the third relay 66 to thereby connect only the first voltage source 54a to the vehicle load 52. The plurality of operating modes may also include a third operating mode and providing electrical power according to the third operating mode may comprise opening the first relay 62, opening the second relay 64, and closing the third relay 66 to thereby connect only the second voltage source 54b to the vehicle load 52. The plurality of operating modes may also include a fourth operating mode and providing electrical power according to the fourth operating mode may comprise opening the first relay 62, closing the second relay 64, and closing the third relay 66 to thereby connect the first and second voltage sources 54a, 54b to the vehicle load 52, wherein the first and second voltage sources 54a, 54b are connected in parallel.

The vehicle may comprise an electric vehicle and the vehicle load 52 may comprise a direct current (DC) link capacitor. The method may further comprise connecting a pre-charge relay 68 operable between an open position and a closed position in parallel with the main positive relay 56, and closing the pre-charge relay 68 before opening or closing any of the first relay 62, the second relay 64, and/or the third relay 66.

Still referring still to FIGS. 1A-1B, 2A-2D, and 3A-3C, the present disclosure describes a non-transitory computer readable storage medium having stored computer executable instructions for providing multi-mode electrical power to a load 52 in a vehicle, the vehicle comprising (i) a first voltage source 54a having a positive side and a negative side, (ii) a second voltage source 54b having a positive side and a negative side, (iii) a main positive relay 56 having a first side and a second side, the second side of the main positive relay 56 connected to a first side of the load 52, (iv) a main negative relay 60 having a first side and a second side, the second side of the main negative relay 60 connected to a second side of the load 52, (v) a first relay 62 operable between an open position and a closed position, the first relay 62 having a first side and a second side, the first side of the first relay 62 connected to the positive side of the first voltage source 54a, and the second side of the first relay 62 connected to the negative side of the second voltage source 54b, (vi) a second relay 64 operable between an open position and a closed position, the second relay 64 having a first side and a second side, the first side of the second relay 64 connected to the positive side of the first voltage source 54a, and the second side of the second relay 64 connected to the positive side of the second voltage source 54b and the first side of the main positive relay 56, (vii) a third relay 66 operable between an open position and a closed position, the third relay 66 having a first side and a second side, the first side of the third relay 66 connected to the negative side of the second voltage source 54b, and the second side of the third relay 66 connected to the first side of the main negative relay 60, and (viii) a controller 70 configured to independently control operation of the first relay 62, the second relay 64, and the third relay 66 between open and closed positions.

The computer executable instructions may be configured to cause the controller to provide electrical power from the first voltage source 54a and/or the second voltage source 54b to the vehicle load 52 according to one of a plurality of operating modes based on the open or closed positions of the first relay 62, the second relay 64, and the third 66 relay. In that regard, the plurality of operating modes may include a first operating mode and, to provide electrical power according to the first operating mode, the computer executable instructions may be configured to cause the controller 70 to close the first relay 62, open the second relay 64, and open the third relay 66 to thereby connect the first and second voltage sources 54a, 54b to the vehicle load 52, wherein the first and second voltage source 54a, 54b are connected in series. The plurality of operating modes may include a second operating mode and, to provide electrical power according to the second operating mode, the computer executable instructions may be configured to cause the controller 70 to open the first relay 62, close the second relay 64, and open the third relay 66 to thereby connect only the first voltage source 54a to the vehicle load 52. The plurality of operating modes may also include a third operating mode and, to provide electrical power according to the third operating mode, the computer executable instructions are configured to cause the controller 70 to open the first relay 62, open the second relay 64, and close the third relay 66 to thereby connect only the second voltage source 54b to the vehicle load 52. The plurality of operating modes may further include a fourth operating mode and, to provide electrical power according to the fourth operating mode, the computer executable instructions are configured to cause the controller 70 to open the first relay 62, close the second relay 64, and close the third relay 66 to thereby connect the first and second voltage sources 54a, 54b to the vehicle load 52, wherein the first and second voltage sources 54a, 54b are connected in parallel.

The vehicle may comprise an electric vehicle and the vehicle load 52 may comprise a direct current (DC) link capacitor. A pre-charge relay 68 operable between an open position and a closed position may be connected in parallel with the main positive relay 56, and the computer executable instructions may be configured to cause the controller 70 to close the pre-charge relay 68 before opening or closing any of the first relay 62, the second relay 64, and/or the third relay 66. As previously described, the computer executable instructions described herein may be stored in or on a computer readable storage medium which may comprise any known type of storage medium or device and may be part of or associated with the controller 70.

The present disclosure thus describes an improved circuit and method for providing multi-mode electrical power to an electrical load in a vehicle. The improved circuit and method of the present disclosure provide a topology of a HV architecture for an electric vehicle that reduces the number of components needed. For example, topology 50 shown in FIG. 1B utilizes only a single pre-charge relay 68 and associated pre-charge resistor, whereas topology 10 shown in FIG. 1A utilizes two pre-charge relays 16a, 16b and two associated pre-charge resistors. The improved circuit and method of the present disclosure thereby reduce both cost and the number of possible failure points associated therewith. The improved circuit and method also provide a simplified and/or improved relay control sequence for detecting the status of relays in a HV architecture and providing multiple modes of power to a vehicle electrical load. For example, topology 50 advantageously implements a multi-mode (e.g., 800V/400V) compatible HV architecture.

As is readily apparent from the foregoing, various non-limiting exemplary embodiments of a circuit and method for providing multi-mode electrical power to an electrical load in a vehicle have been described. While various embodiments have been illustrated and described herein, they are non-limiting and exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A circuit for providing multi-mode electrical power to a load in a vehicle, the circuit comprising:
   a first voltage source having a positive side and a negative side;
   a second voltage source having a positive side and a negative side;
   a main positive relay having a first side and a second side, the second side of the main positive relay connected to a first side of the load;
   a main negative relay having a first side and a second side, the second side of the main negative relay connected to a second side of the load;
   a first relay operable between an open position and a closed position, the first relay having a first side and a second side, the first side of the first relay connected to the positive side of the first voltage source, and the second side of the first relay connected to the negative side of the second voltage source;
   a second relay operable between an open position and a closed position, the second relay having a first side and a second side, the first side of the second relay connected to the positive side of the first voltage source, and the second side of the second relay connected to the positive side of the second voltage source and the first side of the main positive relay; and
   a third relay operable between an open position and a closed position, the third relay having a first side and a second side, the first side of the third relay connected to the negative side of the second voltage source, and the second side of the third relay connected to the first side of the main negative relay.

2. The circuit of claim 1 wherein electrical power is provided from the first voltage source and/or the second voltage source to the vehicle load according to one of a plurality of operating modes based on the open or closed positions of the first, second, and third relays.

3. The circuit of claim 1 wherein, in a first operating mode, the first relay is closed, the second relay is open, and the third relay is open to thereby connect the first and second voltage sources to the load, wherein the first and second voltage source are connected in series.

4. The circuit of claim 1 wherein, in a second operating mode, the first relay is open, the second relay is closed, and the third relay is open to thereby connect only the first voltage source to the load.

5. The circuit of claim 1 wherein, in a third operating mode, the first relay is open, the second relay is open, and the third relay is closed to thereby connect only the second voltage source to the load.

6. The circuit of claim 1 wherein, in a fourth operating mode, the first relay is open, the second relay is closed, and the third relay is closed to thereby connect the first and second voltage sources to the load, wherein the first and second voltage sources are connected in parallel.

7. The circuit of claim 1 further comprising a controller configured to independently control operation of the first, second, and third relays between open and closed positions.

8. The circuit of claim 1 wherein the vehicle load comprises a direct current (DC) link capacitor, the circuit further comprising a pre-charge relay operable between an open position and a closed position, the pre-charge relay connected in parallel with the main positive relay.

9. A method for providing multi-mode electrical power to a load in a vehicle having a first voltage source and a second voltage source, the load having a first side and a second side, the first voltage source having a positive side and a negative side, and the second voltage source having a positive side and a negative side, the method comprising:
   connecting a main positive relay having a first side and second side to the vehicle load by connecting the second side of the main positive relay to the first side of the load;
   connecting a main negative relay having a first side and second side to the vehicle load by connecting the second side of the main negative relay to the second side of the load;
   connecting a first relay having a first side and a second side to the first voltage source and the second voltage source by connecting the first side of the first relay to the positive side of the first voltage source and connecting the second side of the first relay to the negative side of the second voltage source;
   connecting a second relay having a first side and a second side to the first voltage source, the second voltage source, and the main positive relay by connecting the first side of the second relay to the positive side of the first voltage source and connecting the second side of the second relay to the positive side of the second voltage source and the first side of the main positive relay;
   connecting a third relay having a first side and a second side to the second voltage source and the main negative relay by connecting the first side of the third relay to the negative side of the second voltage source and connecting the second side of the third relay to the first side of the main negative relay;
   wherein each of the first, second, and third relays is independently operable between an open position and a closed position; and
   providing electrical power from the first voltage source and/or the second voltage source to the vehicle load according to one of a plurality of operating modes by opening or closing each of the first, second, and third relays.

10. The method of claim 9 wherein the plurality of operating modes includes a first operating mode and providing electrical power according to the first operating mode comprises:
   closing the first relay;
   opening the second relay; and
   opening the third relay;
   to thereby connect the first and second voltage sources to the vehicle load, wherein the first and second voltage source are connected in series.

11. The method of claim 9 wherein the plurality of operating modes includes a second operating mode and providing electrical power according to the second operating mode comprises:
   opening the first relay;
   closing the second relay; and
   opening the third relay;
   to thereby connect only the first voltage source to the vehicle load.

12. The method of claim 9 wherein the plurality of operating modes includes a third operating mode and providing electrical power according to the third operating mode comprises:
  opening the first relay;
  opening the second relay; and
  closing the third relay;
  to thereby connect only the second voltage source to the vehicle load.

13. The method of claim 9 wherein the plurality of operating modes includes a fourth operating mode and providing electrical power according to the fourth operating mode comprises:
  opening the first relay;
  closing the second relay; and
  closing the third relay;
  to thereby connect the first and second voltage sources to the vehicle load, wherein the first and second voltage sources are connected in parallel.

14. The method of claim 9 wherein the vehicle load comprises a direct current (DC) link capacitor, the method further comprising:
  connecting a pre-charge relay operable between an open position and a closed position in parallel with the main positive relay; and
  closing the pre-charge relay before opening or closing any of the first, second, and third relays.

15. A non-transitory computer readable storage medium having stored computer executable instructions for providing multi-mode electrical power to a load in a vehicle, the vehicle comprising (i) a first voltage source having a positive side and a negative side, (ii) a second voltage source having a positive side and a negative side, (iii) a main positive relay having a first side and a second side, the second side of the main positive relay connected to a first side of the load, (iv) a main negative relay having a first side and a second side, the second side of the main negative relay connected to a second side of the load, (v) a first relay operable between an open position and a closed position, the first relay having a first side and a second side, the first side of the first relay connected to the positive side of the first voltage source, and the second side of the first relay connected to the negative side of the second voltage source, (vi) a second relay operable between an open position and a closed position, the second relay having a first side and a second side, the first side of the second relay connected to the positive side of the first voltage source, and the second side of the second relay connected to the positive side of the second voltage source and the first side of the main positive relay, (vii) a third relay operable between an open position and a closed position, the third relay having a first side and a second side, the first side of the third relay connected to the negative side of the second voltage source, and the second side of the third relay connected to the first side of the main negative relay, and (viii) a controller configured to independently control operation of the first, second, and third relays between open and closed positions, the computer executable instructions configured to cause the controller to:
  provide electrical power from the first voltage source and/or the second voltage source to the vehicle load according to one of a plurality of operating modes based on the open or closed positions of the first, second, and third relays.

16. The non-transitory computer readable storage medium of claim 15 wherein the plurality of operating modes includes a first operating mode and, to provide electrical power according to the first operating mode, the computer executable instructions are configured to cause the controller to:
  close the first relay;
  open the second relay; and
  open the third relay;
  to thereby connect the first and second voltage sources to the vehicle load, wherein the first and second voltage source are connected in series.

17. The non-transitory computer readable storage medium of claim 15 wherein the plurality of operating modes includes a second operating mode and, to provide electrical power according to the second operating mode, the computer executable instructions are configured to cause the controller to:
  open the first relay;
  close the second relay; and
  open the third relay;
  to thereby connect only the first voltage source to the vehicle load.

18. The non-transitory computer readable storage medium of claim 15 wherein the plurality of operating modes includes a third operating mode and, to provide electrical power according to the third operating mode, the computer executable instructions are configured to cause the controller to:
  open the first relay;
  open the second relay; and
  close the third relay;
  to thereby connect only the second voltage source to the vehicle load.

19. The non-transitory computer readable storage medium of claim 15 wherein the plurality of operating modes includes a fourth operating mode and, to provide electrical power according to the fourth operating mode, the computer executable instructions are configured to cause the controller to:
  open the first relay;
  close the second relay; and
  close the third relay;
  to thereby connect the first and second voltage sources to the vehicle load, wherein the first and second voltage sources are connected in parallel.

20. The non-transitory computer readable storage medium of claim 15 wherein the vehicle load comprises a direct current (DC) link capacitor, wherein a pre-charge relay operable between an open position and a closed position is connected in parallel with the main positive relay, and wherein the computer executable instructions are configured to cause the controller to close the pre-charge relay before opening or closing any of the first, second, and third relays.

* * * * *